June 27, 1939.  J. MASIN  2,164,158
PERCOLATOR
Filed July 1, 1937  2 Sheets-Sheet 1
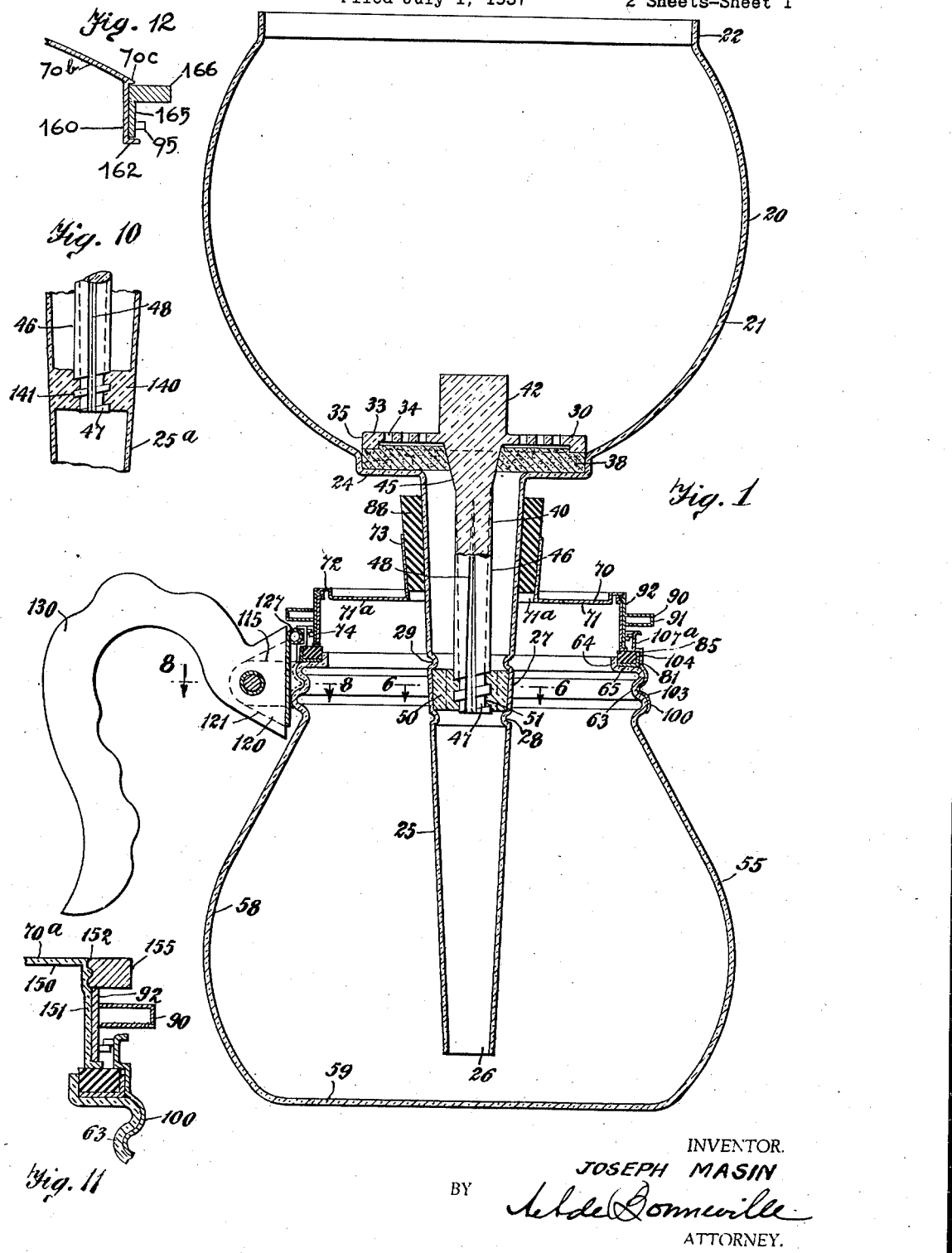
INVENTOR.
JOSEPH MASIN
BY
ATTORNEY.

June 27, 1939.  J. MASIN  2,164,158
PERCOLATOR
Filed July 1, 1937  2 Sheets-Sheet 2
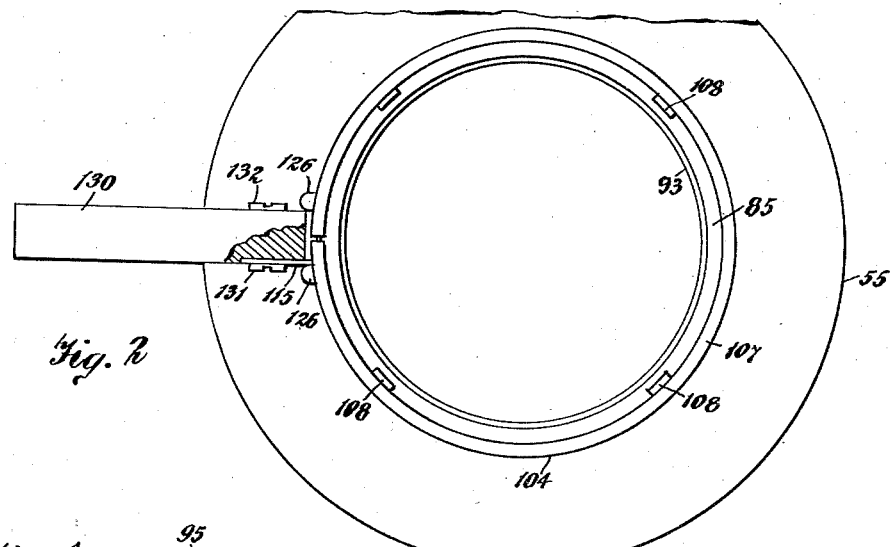
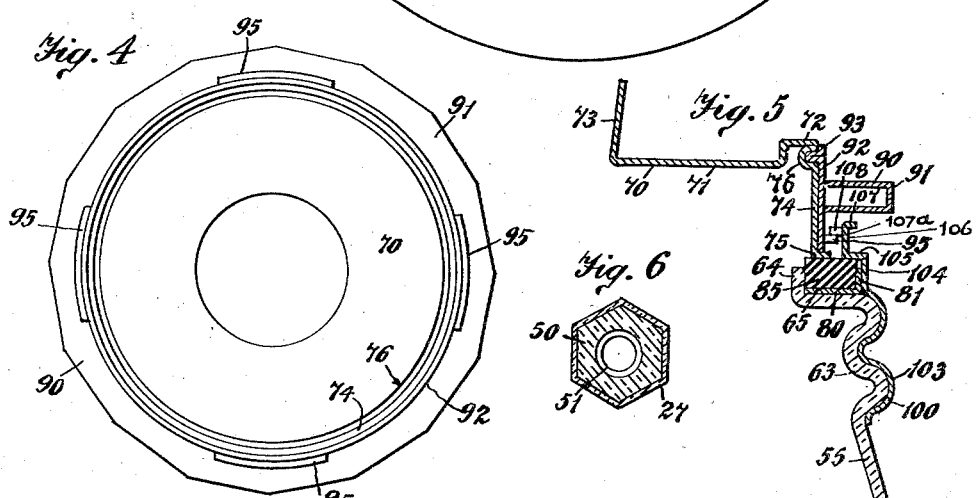
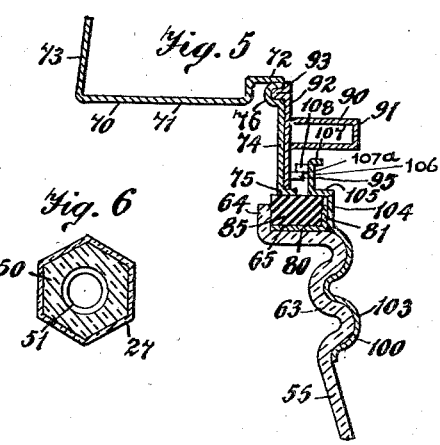
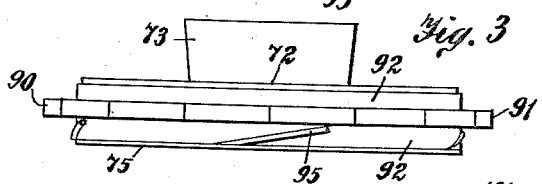
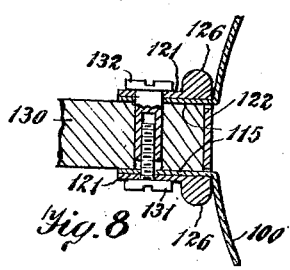
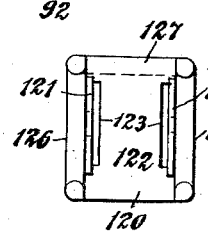
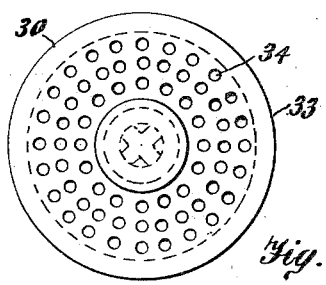
INVENTOR.
JOSEPH MASIN
BY
ATTORNEY.

Patented June 27, 1939

2,164,158

UNITED STATES PATENT OFFICE 2,164,158

PERCOLATOR

Joseph Masin, New York, N. Y.

Application July 1, 1937, Serial No. 151,403

3 Claims. (Cl. 53—3)

This invention relates to a percolator.

The object of the invention is the production of a pair of receptacles, which are detachably connected to each other to be enabled to easily clean both without the use of any tools.

The second object of the invention is the production of a percolator for coffee which comprises a pair of detachable receptacles, which have interposed between them a flexible filter, by means of which the coffee grounds, oils and other foreign matter in coffee are prevented entering the fluid coffee, to avoid the coffee becoming rancid.

Other objects will be apparent from the specifications and drawings.

In the drawings Fig. 1 represents an axial vertical section of the improved percolator; Fig. 2 shows a partial top plan view of the lower portion of Fig. 1 with a partial section; Fig. 3 indicates an elevation of a detail of Fig. 1; Fig. 4 shows a bottom view of Fig. 3; Fig. 5 represents a fragmentary enlarged portion of Fig. 1; Fig. 6 is a section of Fig. 1 on the line 6, 6; Fig. 7 represents a top plan view of the strainer of the percolator; Fig. 8 shows a section of Fig. 1 on the line 8, 8; Fig. 9 indicates a front elevation of a detail of Fig. 1; Fig. 10 represents a fragmentary portion of Fig. 1 modified; Fig. 11 indicates an enlarged fragmentary portion of Fig. 1 with a modification, and Fig. 12 shows an enlarged fragmentary portion of Fig. 1 with a further modification.

In the drawings 20 indicates an upper spherical shaped receptacle for coffee, preferably of glass, which coacts with the lower bulb shaped receptacle 55 for water, preferably of glass.

The spherical shaped receptacle 20 is shown with the spherical body portion 21, which has extending from its upper end the cylindrical flange 22. The lower end of the body portion 21 has integral therewith the cup shaped seat 24. A conical shaped nozzle 25, having the bottom opening 26, extends from the seat 24 into the bulb shaped receptacle 55. In about the middle portion of the nozzle 25, see Figs. 1 and 6, the said nozzle is shown with the hexagonal portion 27. Below the hexagonal portion 27 is indicated the circular shaped supporting flange 28, and above said portion 27 is shown the upper circular clamping flange 29.

For the cup shaped seat 24 is provided the strainer, preferably of glass, indicated in its entirety by the numeral 30, see Figs. 1 and 7. The strainer 30 in this instance comprises the cup shaped hood 33, which has extending therethrough the perforations 34, and is shown with the lower circular flange 35. In the cup shaped seat 24 is positioned the disc 38 of filtering material.

The hood 33 has integral therewith the stem 40. The latter at its upper end has integral therewith the strainer 30 and the cap 42. The stem 40 extends below the said hood 33 and comprises the upper tapered portion 45, which joins with the cylindrical portion 46.

At the lower end of the cylindrical portion 46, is shown the threaded lower end 47. Longitudinal conveying channels 48 are indicated in the outer surface of the cylindrical portion 46 of the stem.

A hexagonal adjusting plug 50, preferably of glass, is seated upon the supporting flange 28 of the nozzle 25. After the plug 50 is positioned in place the clamping flange 29 is formed in the nozzle 25 for the plug 50. The plug 50 is provided with an interior thread 51 which is in mesh with the threaded end 47 of the cylindrical portion of the stem. By turning the cap 42 the flange 35 is brought to bear on the disc 38 to tightly clamp it in operative position.

The bulb shaped receptacle 55, see Figs. 1 and 5, comprises the bulb shaped wall 58, the bottom wall 59, and the large fluted neck 63 at its upper end, which terminates in the vertical circular flange 64 and the horizontal seat 65.

A detachable cover, preferably of metal, for the receptacle 55 is indicated in its entirety by the numeral 70. The cover 70 comprises the annular top wall 71 having the upper circumferential portion 72. From the wall 71 upwardly extends the tapered tubular support 73. The cylindrical wall of the cover 70 is indicated at 74 with the foot 75. At the upper end of the wall 74 is shown the cylindrical locking groove 76 and the latter joins with the circumferential portion 72.

An angle shaped metallic ring comprises the supporting member 80 and the vertical flange 81.

The supporting member 80 is positioned upon the seat 65.

A rubber gasket 85 is seated upon the supporting member 80 between the flanges 64 and 81. An annular rubber plug 88 is seated in the tubular support 73 and hugs the nozzle 25.

An adjustable locking member for the cover 70 is indicated in its entirety by the numeral 90, see Figs. 1, 3, 4 and 5. The member 90 comprises the hollow polygonal portion 91, which has integral therewith the vertical cylindrical rotatable member 92. A U shaped locking projection 93 is shown at the upper end of the member 92 and engages the locking groove 76. Adjacent to the lower end of the member 92 are indicated the inclined locking cams 95.

A clamping band is indicated in its entirety by the numeral 100, see Figs. 1, 2, 5 and 8.

The clamping band 100 comprises the lower portion 103, which engages the fluted neck 63 of the receptacle 55. From the fluted portion 103 extends the vertical flange 104 and the latter joins with horizontal annular portion 105. The latter joins with the vertical member 106, having the top flange 107, forming the locking pocket 107a. From the member 106 extend the horizontal locking cams 108, which coact with the inclined locking cams 95. From the ends of the band extend the lugs 115.

Upon the lugs 115 is supported the handle bracket designated in its entirety by the numeral 120, see Figs. 1, 8 and 9.

The handle bracket 120 comprises the triangular shaped side members 121, which extend from the rear member 122, having the openings 123 for the lugs 115. Cylindrical projections 126 extend from the sides of the rear member 122 and a cylindrical projection 127 extends from the top of the member 122.

A handle is indicated at 130, the upper end of which is positioned between the lugs 115. A male screw 131 coacts with the female screw 132. The said screws extend through the upper end of the handle 130 to detachably clamp the same between the lugs 115.

Referring to Fig. 10, a fragmentary portion of a modified inlet and outlet nozzle is indicated at 25a. The modified nozzle has integral therewith the disc member 140 having an axial threaded opening 141. The cylindrical portion 46 of the stem 40 is again shown having the threaded end 47, which latter engages the threaded opening 141. The longitudinal conveying channels are again indicated at 48.

Referring to Fig. 11 a fragmentary portion of Fig. 5 is shown with a modification. In this instance the detachable cover is of glass and is indicated in its entirety by the numeral 70a. The top wall of the cover is indicated at 150 which joins with the cylindrical wall 151. At the upper end and outer surface of the latter is indicated the thread 152. A nut 155 of metal is in threaded engagement with the thread 152. The fluted neck of the bulb shaped receptacle is again shown at 63. The clamping band is again shown at 100 with its appurtenances.

The adjustable member of the cover is indicated at 90 with its vertical cylindrical member 92.

Referring to Fig. 12, the cover in this modification comprises the spherical shaped wall 70b, which has the circular flange 70c integral therewith.

The cylindrical wall of the cover 70b is indicated at 160 with the foot 162 at its lower end. An adjustable locking member for the cover comprises the cylindrical wall 165 with the polygonal head 166. The wall 165 has again extending therefrom inclined locking cams 95, one of which is shown. The inner end of the top face of the head 166 extends below the circular flange 70c, and the said flange bears upon said head 166. The lower end of the wall 165 is adapted to bear upon the foot 162.

To operate the percolator its members are assembled as indicated in Fig. 1, and the receptacle 20 with its nozzle 25 is removed from the bulb shaped receptacle 55. Water is poured into the receptacle 55 through the tubular support 73, and the receptacle 20 is again placed in operative position. Next ground coffee is dropped into the receptacle 20 through the opening of its flange 22. The user then places the percolator upon a heated stove, by means of which the water in the receptacle 55 is heated. The vapor generated bears upon the water in the receptacle 55, and thereby it is forced up and through the nozzle 25, the filtering material 38 and the perforations 34 of the hood 33, into the receptacle 20. The water then mixes with the ground coffee in said receptacle 20.

The receptacle 55 is now removed from the source of heat and a partial vacuum is formed in the said receptacle 55. The liquid coffee in the receptacle 20 is drawn into the receptacle 55, and the coffee grounds, oils and other foreign matter, remain in the receptacle 20.

The receptacle 20 with its appurtenances is removed from the receptacle 55 and the liquid coffee in the latter is ready for use.

The fact that the hood 33 is made of glass preserves the purity of the coffee and the tapered portion 45 of the stem 40 in contacting with the disc of filtering material 38 provides a tight connection, between the receptacles 20 and filtering material and prevents the coffee grounds entering the receptacle 55. The disc 38 of filtering material which is resilient provides a cushion between the cup shaped seat 24 and the flange 35 of the hood 33 to prevent the breakage of the receptacle 20 and injury to the connections between the stem 40 and the plug 50.

The fact that the polygonal portion 91 is rotatable and that its cylindrical member 92 bears upon the foot 75 instead of bearing on the rubber gasket 85, the cover 70 is easily removed, as there is no friction between the cover and gasket while the former is turned.

It will be noted that the coaction of the cams 95 and 108 forces the foot 75 of the cover 70 against the gasket 85, and provides a seal between the cover 70 and the receptacle 55 to enable a partial vacuum to be formed in said receptacle 55.

It is to be noted that the cover 70a may be made of glass in view of having connected thereto the polygonal nut 155 of metal.

Various modifications may be made in the invention and the present exemplification is to be taken as illustrative and not limitative thereof.

Having described my invention I claim:

1. In a percolator the combination of an upper receptacle for ground coffee and a lower receptacle for water, said lower receptacle having a fluted neck with a horizontal seat and a vertical circular flange at its upper end, a detachable cover for said lower receptacle functioning as a coupling means for the receptacles, the said cover comprising an annular top wall having a tapered tubular support integral therewith for connecting it with the upper receptacle, said cover having a cylindrical wall with a foot at its lower end and a U shaped cylindrical locking groove at its upper end, an angular shaped metallic ring positioned upon the seat of the fluted neck, a gasket positioned upon said ring, a fluted clamping band engaging the fluted neck of the lower receptacle, means to clamp the band against the fluted neck of the lower receptacle, a vertical cylindrical member at the upper end of the clamping band, horizontal locking cams extending from the inner surface of said vertical member of the clamping band and a rotatable cylindrical member bearing against the cylindrical wall of the cover with its lower edge bearing against the foot at the lower end of the cover, and having inclined locking cams extending therefrom coacting with the horizontal cams of the vertical cylindrical member of the clamping band.

2. The combination of an upper and a lower receptacle, the latter having a fluted neck with a horizontal seat at its upper end, a detachable cover of glass for said lower receptacle functioning as a coupling means for the receptacles, said cover comprising a top wall and a cylindrical wall, the latter having a thread at its upper end, a metallic nut in threaded engagement with said thread, a resilient gasket between the seat of the said neck and the cylindrical wall of the cover, a clamping band encircling said neck and extending above the same, and means interposed between said band and said cylindrical wall to force said wall against said gasket.

3. In a percolator the combination of an upper receptacle and a lower receptacle, the lower receptacle having a fluted neck at its upper end, said fluted neck terminating in a vertical circular flange with a horizontal seat, an angle shaped metallic ring positioned upon said seat, a gasket seated upon the ring, a clamping band comprising a lower fluted portion engaging the fluted neck of the lower receptacle, the fluted portion of the band having a vertical flange extending therefrom, the latter having a horizontal member integral therewith, the horizontal member having a vertical member integral therewith, the latter member having a plurality of cams extending therefrom, a spherical shaped cover for the lower receptacle functioning as a coupling between the receptacles, the said cover having a cylindrical wall, the latter having a foot at its lower end, a locking member for said cover comprising a cylindrical wall bearing against the cylindrical wall of the cover, the wall of the locking member having a polygonal portion integral therewith at its upper end, the lower end of the wall of the locking member adapted to bear on the foot of the cylindrical wall of the cover, the cylindrical wall of the locking member having a plurality of cams extending therefrom coacting with the cams of the clamping band to force the lower end of the locking member against the foot of the cover.

JOSEPH MASIN.